United States Patent [19]

Asaida

[11] Patent Number: 5,166,782
[45] Date of Patent: Nov. 24, 1992

[54] VIDEO CAMERA
[75] Inventor: Takashi Asaida, Kanagawa, Japan
[73] Assignee: Sony Corporation, Tokyo, Japan
[21] Appl. No.: 714,850
[22] Filed: Jun. 13, 1991

[30] Foreign Application Priority Data

Jun. 22, 1990 [JP] Japan .................................. 2-164665
Jul. 6, 1990 [JP] Japan .................................. 2-177249

[51] Int. Cl.⁵ .............................................. H04N 9/04
[52] U.S. Cl. ........................................ 358/41; 358/50; 358/44
[58] Field of Search ..................... 358/41, 44, 50, 51, 358/13, 21 R, 48, 225, 38, 21 C, 30, 909, 906

[56] References Cited

U.S. PATENT DOCUMENTS

| 4,037,249 | 7/1977 | Pugsley | 358/909 |
|---|---|---|---|
| 4,553,167 | 11/1985 | Kinoshita . | |
| 4,660,073 | 4/1987 | Baumeister | 358/22 C |
| 5,043,803 | 8/1991 | Asaida | 358/41 |
| 5,053,863 | 10/1991 | Ohtsuka | 358/41 |
| 5,055,917 | 10/1991 | Nikoh et al. | 358/21 R |
| 5,095,364 | 3/1992 | Asaida et al. | 358/41 |
| 5,103,299 | 4/1992 | Asaida | 358/41 |

FOREIGN PATENT DOCUMENTS 0171764 2/1986 European Pat. Off. .
0368354 5/1990 European Pat. Off. .
0089790 5/1986 Japan .
0150974 7/1987 Japan .
0221786 9/1988 Japan .

OTHER PUBLICATIONS

SMPTE Publications: "4.2.2 Digital Video (Background and Implementation)" 1989, pp. 77082, SMPTE, New York, US; K. P. Davies: Some concepts for the digital television studio p. 77, left-hand column, line 380 right-hand column, line 14; p. 78, middle column, line 4-p. 79, middle column, line 4, FIGS. 1,5.
Patent Abstracts of Japan, vol. 14, No. 105 (E-0895), Feb. 26, 1990 JP-A-01 305677 (Olympus Optical Co., Ltd.) Aug. 12, 1989.
Patent Abstracts of Japan, vol. 6, No. 60 (E-102)[938], Apr. 17, 1982, and JP-A-57 2172 (Nippon Denki K.K.) Jul. 1, 1982.
Hungarian Scientific Society for Telecommunication, "Proceedings of the Conference and Exhibition on Television Techniques", Budapest, 12th-14th Jun. 1990, vol. 1, pp. 63-70; B. Tichit: Trends in CCD Studio Cameras p. 64, line 34-p. 65, line 16; p. 66, lines 16-37; FIG. 3.

Primary Examiner—James J. Groody
Assistant Examiner—Michael H. Lee
Attorney, Agent, or Firm—Alvin Sinderbrand; William S. Frommer

[57] ABSTRACT

A video camera having a camera head unit connected to a camera control unit converts the outputs of solid-state imaging devices into digital signals, and supplies digital three-color signals and a digital composite video signal, as well as analog three-color signals, an analog composite video signal, and analog component video signals, to respective output terminals.

17 Claims, 7 Drawing Sheets

VIDEO CAMERA

BACKGROUND OF THE INVENTION

1. Field of the Invention

This invention relates to a video camera forming digital signals representing an object projected on an imaging device and, more particularly, to a video camera having a signal processing circuit for performing digital signal processing on output signals of the imaging device.

2. Description of the Prior Art

A so-called separate type video camera, includes a camera head unit (CHU) having an imaging device and a camera control unit (CCU) having an analog signal processing circuit, such as an encoder, for producing composite video signals in a standard television format, such as the NTSC system, from, an imaging output supplied from the camera head unit, and a control signal generator for generating control signals supplied to the camera head unit. The camera head unit and camera control unit are interconnected by a multi-core camera cable, is disclosed in, for example, the Japanese Patent KOKAI Publication No. 2-280580 (1990).

There is also known a video camera not provided with a CCU, that is, provided only with a camera/head unit having a signal processing circuit such as an encoder, or a synchronization signal generator, enclosed therein, and adapted for outputting composite video signals in a standard television format.

These conventional video cameras are adapted for outputting analog composite video signals and analog luminance and color difference signals.

Recently, digital electronic equipment, such as a digital video tape recorder (VTR) for recording and/or reproducing video signals in the form of digital signals, have become popular.

However, with conventional video cameras, the output signals of an imaging device are processed using analog signal processing for outputting the video in the form of analog video signals, so that, when interconnecting a video camera and a digital VTR, for example, it becomes necessary to provide an analog to digital converter at an interface between the camera and the VTR. There is also a problem in that signal deterioration may be produced in a transmission line between the video camera and the analog to digital converter, through which the analog signals are transmitted.

OBJECTS AND SUMMARY OF THE INVENTION

It is a principal object of the present invention to provide a video camera in which output video signals may be supplied to an external electronic system capable of digital signal processing without the necessity of providing an analog to digital converter at the interface between the video camera and the external electronic system.

It is another object of the present invention to provide a video camera which can be electrically connected to an external electronic system capable of digital signal processing by means of a small number of transmission lines.

It is a further object of the present invention to provide a video camera in which transmission of digital video signals between a camera head unit and a camera control unit may be performed over a small number of transmission lines.

It is still another object of the present invention to provide a video camera in which video signals can be processed by image conversion within the camera control unit.

It is yet another object of the present invention to provide a video camera in which video signals suited to a video signal input mode of an external electronic system capable of digital signal processing may be outputted selectively.

In accordance with an aspect of the invention, a video camera comprises first, second and third imaging devices for outputting respective color signals, analog to digital converting means for converting the color signals into digital color signals, signal processing means for forming a digital composite video signal from the digital color signals, first output means for outputting the digital color signals, and second output means for outputting said digital composite video signal.

In accordance with another aspect of the invention, a video camera comprises imaging means for providing output signals corresponding to an object in the field of view of the camera, analog to digital converting means for converting the output signals of said imaging means into digital signals, signal processing means for forming a digital composite video signal from said digital signals, parallel to serial converting means for converting said digital composite signal into serial data, and output means for outputting said serial data.

In accordance with still another aspect of the invention, a video camera comprises imaging means for providing output signals corresponding to an object in the field of view of the camera, camera head means including analog to digital converting means for converting the output signals of said imaging means into parallel format digital signals, and parallel to serial converting means for converting the parallel format digital signals into serial data; transmission means for transmitting the serial data converted by said parallel to serial converting means of said camera head means; and camera control means including serial to parallel converting means for converting said serial data transmitted from said parallel to serial converting means by said transmission means into parallel data signals, signal processing means for processing the parallel data signals to form digital video signals of a predetermined format, and output means for outputting the digital video signals.

In accordance with a further aspect of the invention a video camera comprises imaging means for providing output signals corresponding to an object in the field of view of the camera, camera head means including analog to digital converting means for converting the output signals of said imaging means into parallel format digital signals, and parallel to serial converting means for converting the parallel format digital signals into serial data; transmission means for transmitting the serial data converted by said parallel to serial converting means of said camera head means; and camera control means including serial to parallel converting means for converting said serial data transmitted from said parallel to serial converting means by said transmission means into parallel data signals, image converting means for converting said parallel data signals into image converted signals, to form digital video signals of a predetermined format, and output means for outputting the digital video signals.

In accordance with yet another aspect of the invention, a video camera comprises first, second and third imaging devices for outputting respective color signals, analog to digital converting means for converting the color signals into digital color signals, signal processing means supplied with said digital color signals for forming a digital composite video signal and digital component video signals, selecting means for selecting said digital component video signals or the digital composite video signal as a selected video signal parallel to serial converting means for converting said selected video signal into serial data, and output means for outputting said serial data.

With the video camera embodying the present invention, color signals outputted from first, second and third imaging devices are converted into digital color signals, digital composite video signals are produced on the basis of the digital color signals, and the digital color signals and the digital composite video signals are respectively outputted. Thus the output video signals can be supplied to an external electronic system capable of digital signal processing without the interposition of an analog to digital converter.

Also, with the video camera embodying the present invention, the color signals outputted from the first, second and third imaging devices are converted into digital color signals, a digital composite video signal and digital component video signals are produced on the basis of the digital color signals, the digital component video signals or the digital composite video signal are selected by selecting means, and the selected signals are converted into serial data so as to be outputted. Thus the video signals suited to a video signal input mode of an external electronic system capable of digital signal processing circuit may be outputted selectively.

BRIEF DESCRIPTION OF THE DRAWINGS

FIGS. 6A to 6I are charts for illustrating the operation of the camera head unit shown in FIG. 4.

DETAILED DESCRIPTION OF THE PREFERRED EMBODIMENT

By referring to the drawings, a preferred embodiment of the present invention will be explained in detail.

Figure 1:
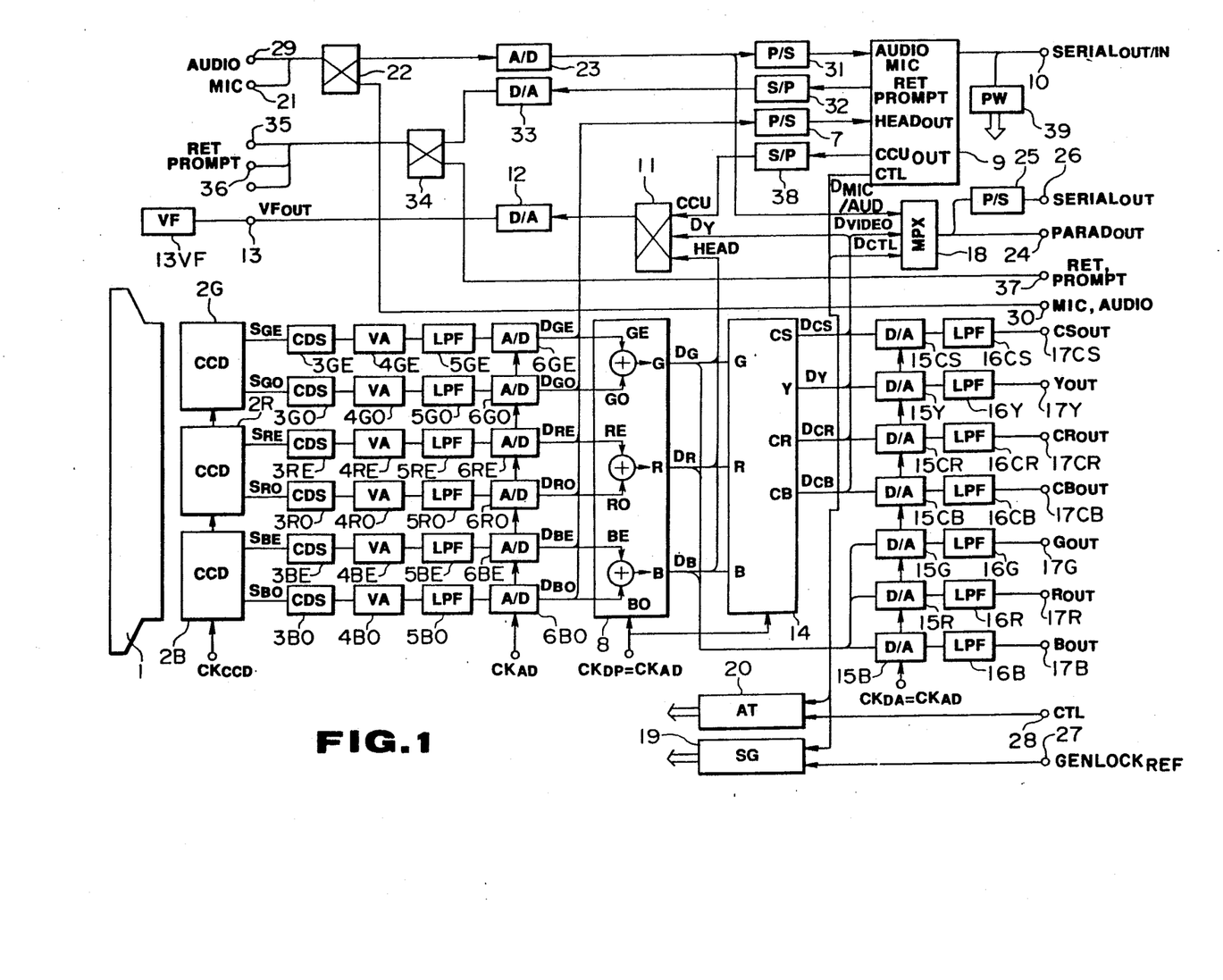
FIG. 1 is a block diagram showing an embodiment of a camera head unit of a video camera according to the present invention.

FIG. 1 shows, in a block diagram, a camera head unit of a video camera according to an embodiment of the present invention.

In the camera head unit, shown in FIG. 1, the present invention includes a three CCD solid state color imaging device in which the imaging light from an object in a field of view is separated by an imaging pickup device 1 into three primary color components and in which three primary color object images are produced by three solid state imaging sensors 2R, 2G and 2B.

Figure 2:
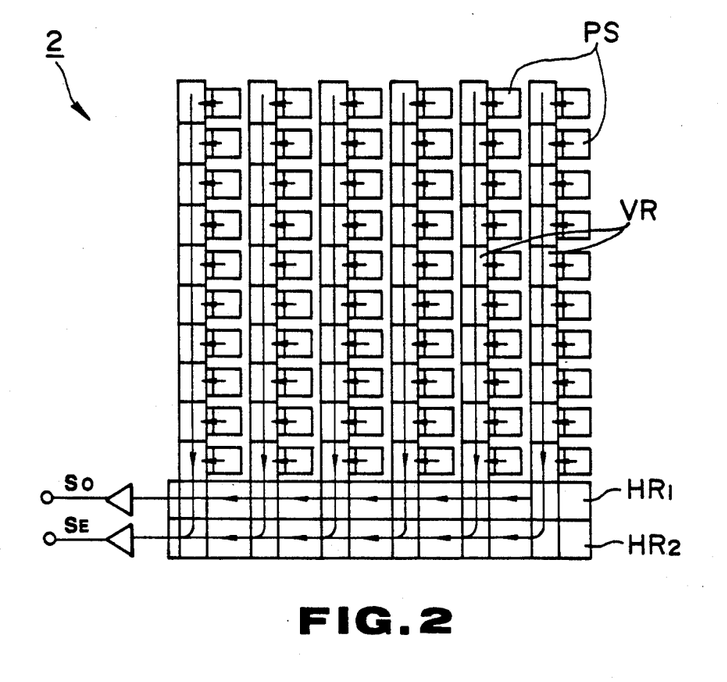
FIG. 2 is a schematic view showing a solid-state imaging device employed in the camera head unit in FIG. 1.

A two-line-concurrent reading type high resolution CCD imaging sensor 2, constructed as a charge coupled device (CCD) as shown in FIG. 2, is used as each of the three solid-state image sensors 2R, 2G and 2B constituting an image pickup section of the camera head unit CHU. This CCD image sensor 2 is provided with a number of vertical transfer registers VR, arranged in a vertical direction along associated photosensor units PS, arrayed in a matrix wherein one photosensor unit provides an imaging output for one pixel of a field for a signal representing the field of view, and two horizontal transfer registers $HR_1$ and $HR_2$, juxtaposed at the terminals of the vertical transfer registers VR. With the CCD image sensor 2, the imaging outputs, obtained at the photosensor units PS, are independently transferred by means of the vertical transfer registers VR, at a rate of two horizontal lines per each horizontal scanning period, to the horizontal transfer registers $HR_1$ and $HR_2$, so that odd-line imaging outputs $S_o$ are sequentially read by means of the horizontal transfer register $HR_1$ and the even-numbered imaging outputs $S_E$ are sequentially read by means of the horizontal transfer register $HR_2$. That is, the imaging outputs for the totality of pixels in each field are read out by means of the two horizontal transfer registers $HR_1$ and $HR_2$.

The three solid-state image sensors 2R, 2G and 2B, each formed as an above described two-line-concurrent reading high resolution CCD image sensor 2, are driven by a CCD driving circuit, not shown, using a driving clock $CK_{CCD}$ having a frequency of, for example, 21.5 MHz.

The solid state image sensor 2R produces a red-color image of the object image. An odd line number red color output signal $S_{RO}$ and an even line number red color image output signal $S_{RE}$, read out simultaneously from the solid-state image sensor 2R, are supplied to level adjustment circuits 4RO and 4RE by means of correlation dual sampling circuits 3RO and 3RE, respectively. The solid-state image sensor 2G produces a green-color image of the object image. An odd line number green color image output signal $S_{GO}$ and an even line number green color image output signal $S_{GE}$, read out simultaneously from the solid-state image sensor 2G, are supplied to level adjustment circuits 4GO and 4GE by means of correlation dual sampling circuits 3GO and 3GE, respectively. The solid-state image sensor 2B produces a blue-color image of the object image. An odd line number blue-color imaging output signal $S_{BO}$ and an even line number blue-color imaging output signal $S_{BE}$, read out simultaneously from the solid-state image sensor 2B, are supplied to level adjustment circuits 4BO and 4BE, by means of correlation dual sampling circuits 3BO and 3BE, respectively.

The correlation dual sampling circuits 3RO, 3RE, 3GO, 3GE, 3BO and 3BE process the three-color imaging output signal $S_{RO}$, $S_{RE}$, $S_{GO}$, $S_{GE}$, $S_{BO}$, and $S_{BE}$, read out two lines at a time from the CCD image sensors 2R, 2G and 2B, by clamping reset noise levels and sample-holding output levels on the basis of the clamped noise level for reducing the reset noise. The level adjustment circuits 4RO, 4RE, 4GO, 4GE, 4BO and 4BE perform level adjustment, such as white balance adjustment, on the two-line-concurrent three-color imaging output signals $S_{RO}$, $S_{RE}$, $S_{GO}$, $S_{GE}$, $S_{BO}$ and $S_{BE}$, which have been processed to reduce reset noise by the correlation dual sampling circuits 3RO, 3RE, 3GO, 3GE, 3BO, and 3BE. The two-line-concurrent three-color imaging output signals $S_{RO}$, $S_{RE}$, $S_{GO}$, $S_{GE}$, $S_{BO}$ and $S_{BE}$, processed for level adjustment by the level adjustment circuits 4RO, 4RE, 4GO, 4GE, 4BO and 4BE, are transmitted by means of low-pass filters 5RO, 5RE, 5GO, 5GE, 5BO and 5BE, respectively, to A/D converters 6RO, 6RE, 6GO, 6GE, 6BO and 6BE, functioning as analog/digital converting means, respectively.

A driving clock $CK_{AD}$ having a frequency four times the frequency of the color subcarrier frequency $f_{SC}$, or $4f_{SC}$, is supplied to the A/D converters 6RO, 6RE, 6GO, 6GE, 6BO and 6BE, by means of a timing generator, not shown. The A/D converters 6RO, 6RE, 6GO, 6GE, 6BO and 6BE digitize the two-line-concurrent three-color imaging output signals $S_{RO}$, $S_{RE}$, $S_{GO}$, $S_{GE}$, $S_{BO}$ and $S_{BE}$ with the $4f_{sc}$ driving clock $CK_{AD}$ to produce two-line-concurrent digital three-color signals $D_{RO}$, $D_{RE}$, $D_{GO}$, $D_{GE}$, $D_{BO}$ and $D_{BE}$, respectively. The two-line-concurrent digital three-color signals $D_{RO}$, $D_{RE}$, $D_{GO}$, $D_{GE}$, $D_{BO}$ and $D_{BE}$, produced by the A/D converters 6RO, 6RE, 6GO, 6GE, 6BO and 6BE, are supplied to a parallel/serial converter (P/S converter) 7 and to a signal processing section 8.

The P/S converter 7 changes the two-line-concurrent digital three color signals $D_{RO}$, $D_{RE}$, $D_{GO}$, $D_{GE}$, $D_{BO}$ and $D_{BE}$, supplied from the A/D converters 6RO, 6RE, 6GO, 6GE, 6BO, and 6BE, from parallel data into serial data. The serial data, produced by the P/S converter 7, are supplied as camera output data $HEAD_{OUT}$ to a light-transmitting encoder/decoder 9.

The encoder/decoder 9 encodes the serial data, that is, the camera output data $HEAD_{OUT}$, supplied from the P/S converter 7, and outputs the encoded data at a serial input/output port 10 over an optical fiber cable, not shown.

Thus, with the present video camera unit, the two-line-concurrent three-color imaging output signals $S_{RO}$, $S_{RE}$, $S_{GO}$, $S_{GE}$, $S_{BO}$ and $S_{BE}$, obtained by the solid-state image sensors 2R, 2G, and 2B, are changed by the A/D converters 6RO, 6RE, 6GO, 6GE, 6BO and 6BE into two-line-concurrent digital three-color signals $D_{RO}$, $D_{RE}$, $D_{GO}$, $D_{GE}$, $D_{BO}$ and $D_{BE}$. The two-line-concurrent digital three-color signals $D_{RO}$, $D_{RE}$, $D_{GO}$, $D_{GE}$, $D_{BO}$ and $D_{BE}$, are converted by the P/S converter 7 into serial data as the camera output data $HEAD_{OUT}$, which are serially outputted at the serial input/output port 10 by means of the encoder/decoder 9.

The signal processing section 8 adds the two-line-concurrent digital three-color signals $D_{RO}$, $D_{RE}$, $D_{GO}$, $D_{GE}$, $D_{BO}$ and $D_{BE}$, supplied from the A/D converters 6RO, 6RE, 6GO, 6GE, 6BO and 6BE, for each of the color signals, in such a manner that switching between upper and lower lines on both sides of a center line is done on a field-by-field basis to form interlaced digital three-color signals $D_R$, $D_G$ and $D_B$. The signal processing section 8 also processes the digital three color signals $D_R$, $D_G$ and $D_B$ using, for example, gamma correction and image enhancement.

The interlaced digital three-color signals $D_R$, $D_G$ and $D_B$, produced by the signal processing section 8, are supplied by a selector 11 to a D/A converter 12, by means of which the signals $D_R$, $D_G$ and $D_B$ are converted into corresponding analog signals which are outputted at an output terminal 13 as an imaging signal $VF_{OUT}$ to a view finder 13 VF connected to the output terminal 13.

The three-color signals $D_R$, $D_G$ and $D_B$, obtained by the signal processing section 8, are supplied to a color encoder 14 and to D/A converters 15R, 15G and 15B.

The D/A converters 15R, 15G, and 15B process the three-color signals $D_R$, $D_G$ and $D_B$, supplied from the signal processing section 8, into corresponding analog three color imaging output signals $R_{OUT}$, $G_{OUT}$ and $B_{OUT}$. The analog three-color imaging output signals $R_{OUT}$, $G_{OUT}$ and $B_{OUT}$, produced by these D/A converters 15R, 15G and 15B, are outputted at three-color signal output terminals 17R, 17G and 17B, by means of low-pass filters 16R, 16G and 16B, respectively.

The color encoder 14, designed for forming digital video signals of a predetermined format compatible with a standard television format, such as the NTSC system, produces digital component video signals in, for example, NTSC format, composed of a digital luminance signal DY and digital color difference signals $D_{CR}$ and $D_{CB}$, from the digital three-color signals $D_R$, $D_G$, and $D_B$, interlaced and processed using gamma correction and image enhancement by the signal processing section 8, while also producing a digital composite video signal $D_{CS}$ in the NTSC format.

The NTSC format digital component imaging signals $D_Y$, $D_{CR}$ and $D_{CB}$, obtained by the color encoder 14, are supplied to D/A converters 15Y, 15CR and 15CB, respectively. These D/A converters 15Y, 15CR and 15CB change the digital component video signals $D_Y$, $D_{CR}$ and $D_{CB}$, supplied from the color encoder 14, into analog component video signals $Y_{OUT}$, $CR_{OUT}$ and $CB_{OUT}$ in the NTSC format. The analog component video signals $Y_{OUT}$, $CR_{OUT}$ and $CB_{OUT}$ in the NTSC format, produced by the D/A converters 15Y, 15CR, 15CB and 15CS, are outputted at analog image signal output terminals 17Y, 17CR and 17CB, by means of low-pass filters 16Y, 16CR and 16CB, respectively.

The digital composite video signal $D_{CS}$ in the NTSC format, produced by the color encoder 14, is supplied to the D/A converter 15CS. The D/A converter 15CS changes the digital composite video signal $D_{CS}$, supplied from the color encoder 14, into an analog composite image signal $CS_{OUT}$ in the NTSC format. The analog composite image signal $CS_{OUT}$ in the NTSC format, produced by the D/A converter 15CS, is outputted at an analog video signal output terminal 17CS by means of a low-pass filter 16CS.

The digital component video signals $D_Y$, $D_{CR}$ and $D_{CB}$ and the digital composite video signal $D_{CS}$ in the NTSC format, produced by the color encoder 14, are supplied to a multiplexor 18. The luminance signals $D_Y$ are also supplied to the D/A converter 12 by means of a selector 11 and changed into corresponding analog signals by the D/A converter 12 so as to be supplied at the output terminal 13 to the view finder 13VF.

The multiplexor 18 is supplied with control data $D_{CTL}$ from a synchronizing circuit block 19 and a control circuit block 20, while being supplied with voice data $D_{MIC}$, from a microphone signal inputted from a microphone input terminal 21 by means of a selector 22 and digitized by an A/D converter 23 into audio data $D_{MIC/AUDIO}$. The multiplexor 18 adds the signals $D_{CTL}$ and $D_{MIC/AUDIO}$ to a digital video signal $D_{VIDEO}$ composed of the digital component Video signals $D_Y$, $D_{CR}$ and $D_{CB}$ or the digital composite video signal $D_{CS}$ supplied from the encoder 14. Output data $D_{MPX}$ from the multiplexor 18, that is, the digital video signal $D_{VIDEO}$ added to the control data $D_{CTL}$ and the audio data $D_{MIC/AUDIO}$, are outputted in parallel at a parallel output port 24, while being converted by P/S converter 25 from parallel data into serial data which are serially outputted at a serial output port 26.

Meanwhile, the synchronizing circuit block 19 is supplied with a reference synchronizing signal GEN-LOCK$_{REF}$ for generator locking through synchronizing input terminal 27, while the control circuit block 20 is supplied with a control signal CTL through a control input terminal 28.

The selector 22 selects the voice data $D_{MIC}$, inputted from the microphone input terminal 21, or the audio signal AUDIO, inputted at an audio input terminal 29, and transmits the selected signal to the A/D converter 23 and to an audio output terminal 30. The A/D converter 23 digitizes the voice data $D_{MIC}$ or the audio signal AUDIO, selectively inputted by means of selector 22. Audio data $D_{MIC/AUDIO}$ from the A/D converter 23 are supplied to the multiplexor 18, while being converted by the P/S converter 31 from parallel data into serial data so as to be serially outputted at the serial input/output port 10 by means of the encoder/decoder 9.

The encoder/decoder 9 encodes the serial data supplied from P/S converters 7 and 31 and serially transmits the encoded serial data via the serial input/output port 10 to a camera control unit CCU described below, while also decoding various serial data transmitted from the camera control unit CCU to the serial input/output port 10, such as return video signals $D_{RET}$, prompter signals $D_{PROMPT}$, output signals $CCU_{OUT}$ from the camera control unit CCU or control data $D_{CTL}$.

The video data $D_{RET}$ and $D_{PROMPT}$, decoded by the encoder/decoder 9, are converted by the S/P converter 32 from serial data into parallel data, which are converted by a digital/analog converter 33 into analog signals, which in turn are outputted by means of a selector 34 at video output terminals 35 and 36. The selector 34 selects the analog video signals RET and PROMPT, supplied to the video input terminal 37 or the video signals converted into analog signals by the A/D converter 33 and outputs the selected signals at the video output terminals 35, 36. Various displaying devices, not shown, for example, a prompter, are connected to the video output terminals 35 and 36. The CCU-outputted video data $CCU_{OUT}$, decoded by the encoder/decoder 9, are converted by S/P converter 38 from serial data into parallel data before being supplied by means of selector 11 to the D/A converter 12. The parallel data are converted by D/A converter 12 into analog data, which are then supplied at the output terminal 13 to the view finder 13VF.

The camera head unit is driven by driving power supplied from a camera control unit CCU to a power source circuit 39 over a power cable enclosed in an optical fiber cable connected to the serial input/output port 10.

Figure 3:
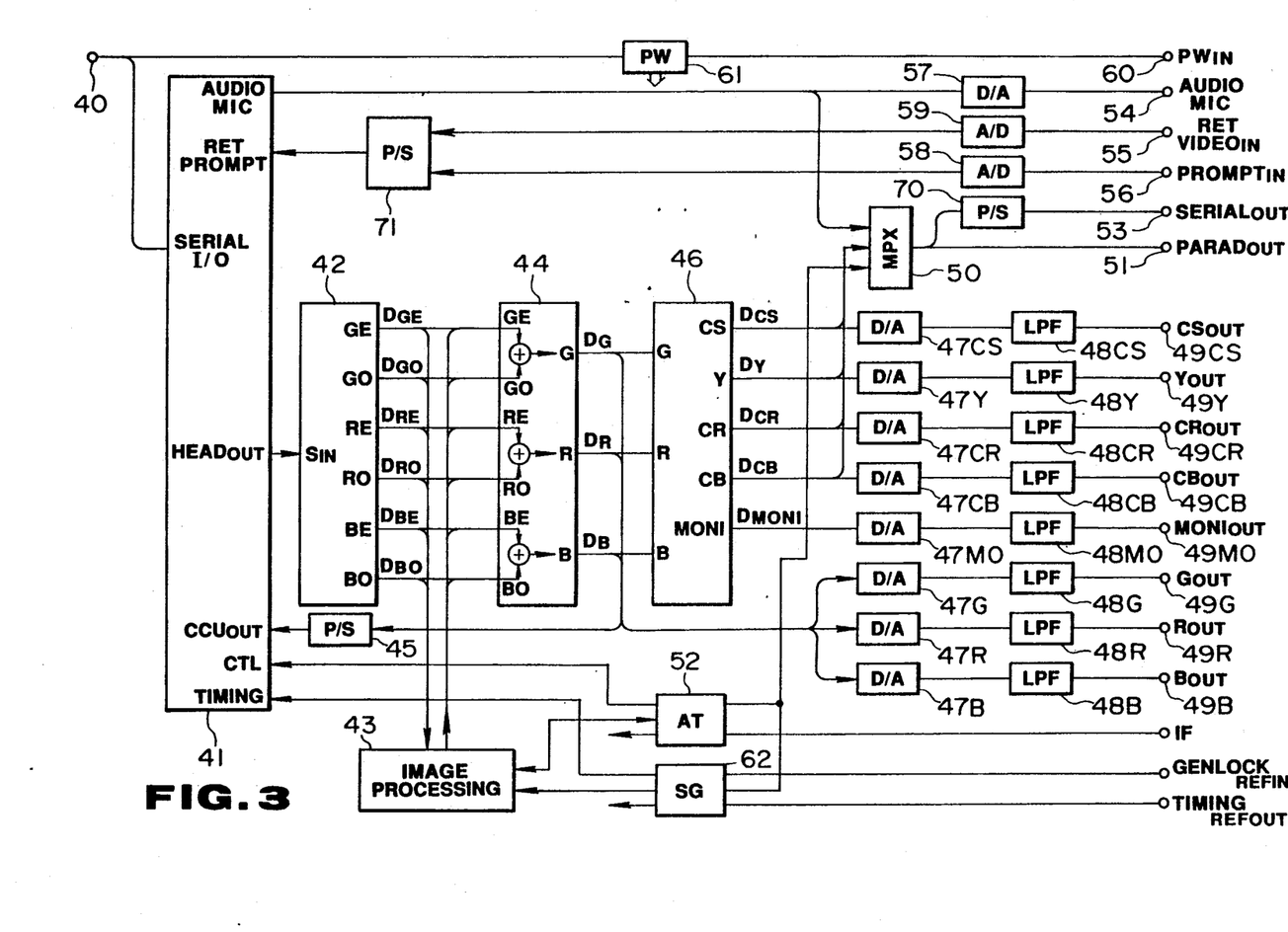
FIG. 3 is a block diagram showing an embodiment of a camera control unit of the video camera shown in FIG. 1.

The video camera according to the present invention is constituted by the above mentioned camera head unit shown in FIG. 1 and the camera control unit CCU arranged and constructed as shown in FIG. 3.

The camera control unit CCU, constituting part of the video camera according to the present invention, is provided with a serial input/output port 40, as shown in FIG. 3, which is connected to the serial input/output port 10 of the camera head unit by an optical fiber cable, not shown, constituting transmission means.

To this serial input/output port 40 is connected an encoder/decoder 41 corresponding to the encoder/decoder 9 of the camera head unit.

The encoder/decoder 41 decodes serial data transmitted from the camera head unit to the serial input/output port 40 over the optical fiber cable to produce the serial video output data $HEAD_{OUT}$, that is the two-line-concurrent digital three-color signals $D_{RO}$, $D_{RE}$, $D_{GO}$, $D_{GE}$, $D_{BO}$ and $D_{BE}$, and supplies the serial video output data $HEAD_{OUT}$ to an S/P converter 42. The S/P converter 42 converts the serial video output data $HEAD_{OUT}$ supplied from the encoder/decoder 41 into parallel two-line-concurrent digital three color signals $D_{RO}$, $D_{RE}$, $D_{GO}$, $D_{GE}$, $D_{BO}$ and $D_{BE}$. The two-line-concurrent digital three color signals $D_{RO}$, $D_{RE}$, $D_{GO}$, $D_{GE}$, $D_{BO}$ and $D_{BE}$, obtained from the S/P converter 42, are transmitted to an image processing section 43 and a signal processing section 44.

The image processing section 43 processes the two-line-concurrent digital three-color signals $D_{RO}$, $D_{RE}$, $D_{GO}$, $D_{GE}$, $D_{BO}$ and $D_{BE}$, supplied from the S/P converter 42, using digital image processing for correcting an optical strain or distortion of the imaging optical system 1 of the camera head unit and for converting the television signals into extended definition television signals. The processed two-line-concurrent digital three-color signals $D_{RO}$, $D_{RE}$, $D_{GO}$, $D_{GE}$, $D_{BO}$ and $D_{BE}$, from the image processing section 43 are supplied to the signal processing section 44.

The signal processing section 44 add the two-line-concurrent digital three-color signals $D_{RO}$, $D_{RE}$, $D_{BO}$ and $D_{BE}$, supplied from the S/P converter 42, and the processed two-line-concurrent digital three-color signals $D_{RO}$, $D_{RE}$, $D_{GO}$, $D_{GE}$, $D_{BO}$ and $D_{BE}$, supplied from the image processing section 43, for each of the respective color signals, in such a manner that switching between upper and lower lines on both sides of a center line is done field by field to produce interlaced digital three-color signals $D_R$, $D_G$ and $D_B$. The signal processing section 44 also processes the interlaced digital three-color signals $D_R$, $D_G$ and $D_B$ using, for example, gamma correction and image enhancement.

The interlaced digital three-color signals $D_R$, $D_G$ and $D_B$, obtained by the signal processing section 44, are supplied to a P/S converter 45, wherein they are converted from parallel data into serial data. The serial data obtained by the P/S converter 45 are supplied as CCU-outputted video data $CCU_{OUT}$ to the encoder/decoder 41. The encoder/decoder 41 encodes the serial data supplied from the P/S converter 45, that is the CCU-outputted video data $CCU_{OUT}$, to output the encoded data at the serial input/output port 40 over an optical fiber cable, not shown.

Thus, in the present camera control unit CCU, the two-line-concurrent digital three color signals $D_{RO}$, $D_{RE}$, $D_{GO}$, $D_{GE}$, $D_{BO}$ and $D_{BE}$, and obtained by the S/P converter 42, are processed by interlacing by the signal processing section 44 either directly or after image processing by the image processing section 43, and the resulting interlaced digital three-color signals $D_R$, $D_G$ and $D_G$ are serially outputted as the CCU-outputted video data $CCU_{OUT}$ from the serial input/output port 40 over the optical fiber cable to the camera head unit. In the camera head unit, the image represented by the CCU-outputted video data $CCU_{OUT}$, serially transmitted from the camera control unit CCU to the serial input/output port 10 over the optical fiber cable, is displayed on the view finder 13VF.

The interlaced digital three-color signals $D_R$, $D_G$ and $D_B$, produced by the signal processing section 44, are supplied to a color encoder 46, and are supplied to D/A converters 47R, 47G and 47B.

The D/A converters 47R, 47G and 47B process the three color signals supplied from the signal processing section 44 to form corresponding analog three-color image output signals $R_{OUT}$, $G_{OUT}$ and $B_{OUT}$. The analog three-color image output signals $R_{OUT}$, $G_{OUT}$ and $B_{OUT}$, produced by the D/A converters 47R, 47G and 47B, are outputted at three-color signal output terminals 49R, 49G and 49B by means of low-pass filters 48R, 48G and 48B, respectively.

The color encoder 46 is adapted for producing digital video signals of a predetermined format compatible with a standard television format, such as the NTSC system. The color encoder 46 produces digital component video signals in, for example, the NTSC format, consisting of the digital luminance signal $D_Y$ and digital color difference signals $D_{CR}$ and $D_{CB}$, from the digital three color signals $D_R$, $D_G$ and $D_B$ processed by the signal processing section 44 using interlacing, gamma correction and image enhancement, while producing the digital composite video signal $D_{CS}$ and monitoring digital video signal $D_{MONI}$ in the NTSC format.

The digital component video signals $D_Y$, $D_{CR}$ and $D_{CB}$ in the NTSC format, obtained by the color encoder 46, are supplied to the D/A converters 47Y, 47CR and 47CB, respectively. These D/A converters 47Y, 47CR and 47CB process the digital component video signals $D_Y$, $D_{CR}$ and $D_{CB}$, supplied from the color encoder 46, into corresponding analog component video signals $Y_{OUT}$, $CR_{OUT}$ and $CB_{OUT}$. The analog component video signals of the NTSC system $Y_{OUT}$, $CR_{OUT}$ and $CB_{OUT}$, produced by the D/A converters 47Y, 47CR, 47CB and 47CS, are outputted by means of low-pass filters 48Y, 48CR and 48CB at the analog video signal output terminals 49Y, 49CR and 49CB, respectively.

The digital composite video signal $D_{CS}$ in the NTSC format produced by the color encoder 46, is supplied to the D/A converter 47CS. The D/A converter 47CS processes the digital composite video signal $D_{CS}$ supplied from the color encoder 46, into a corresponding analog composite video signal $CS_{OUT}$ in the NTSC format. The analog composite video signal $CS_{OUT}$, produced by the D/A converter 47CS, is outputted by means of a low-pass filter 48CS at an analog video signal output terminal 49CS.

The monitoring digital video signal $D_{MONI}$ produced by the color encoder 46 is supplied to a D/A converter 47MO. The D/A converter 47MO processes the monitoring digital video signal $D_{MONI}$, supplied from the color encoder 46, into a corresponding analog monitoring video signal $MONI_D$. The analog monitoring video signal $MONI_D$ produced by the D/A converter 47MO, is outputted by means of a low-pass filter 48MO at an analog monitoring video signal output terminal 49MO.

The digital component video signals $D_Y$, $D_{CR}$ and $D_{CB}$ and digital composite video signal $D_{CS}$ in the NTSC format, produced by the encoder 46, are supplied to a multiplexor 50.

The multiplexor 50 is supplied with control data $D_{CTL}$ from a synchronizing circuit block 62 or a control circuit block 52 and with audio data $D_{MIC/AUDIO}$ decoded by the encoder/decoder 41 from serial data transmitted from the camera head unit to the serial input/output port 40 over the optical fiber cable, and adds these signals to a digital video signal $D_{VIDEO}$ composed of the digital component video signals $D_Y$, $D_{CR}$ and $D_{CB}$ or the digital composite video signal $D_{CS}$ supplied from the color encoder 46. Output data $D_{MPX}$ from multiplexor 50, that is, the digital video signal $D_{VIDEO}$ added to the control data $D_{CTL}$ and audio data $D_{MIC/AUDIO}$ are outputted in parallel at a parallel output port 51, and are converted by a P/S converter 70 from parallel data into serial data so as to be serially outputted at a serial output port 53.

The audio data $D_{MIC/AUDIO}$, decoded by the encoder/decoder 41, are also processed by a D/A converter 57 into a corresponding analog signal which is outputted at an audio output terminal 54.

The camera control unit CCU is also provided with A/D converters 59 and 58 for digitizing video signals supplied through video input terminals 55 and 56, respectively, from an external device, not shown, such as return video signal RET VIDEO or prompter signal PROMPT, and with a P/S converter 71 for converting the digitized video data from the A/D converters 59 and 58 from parallel data into serial data. The digitized video data from the A/D converters 59 and 58 are converted by the P/S converter 71 from parallel data into serial data for serial output at the serial input/output port 40.

In the present video camera, video signals obtained by the camera head unit are digitized and serially transmitted from the camera head unit to the camera control unit CCU, whilst video signals supplied from an external system to the camera control unit CCU are digitized and serially transmitted from the camera control unit CCU to the camera head unit.

The present camera control unit CCU is drive by driving power supplied from a power source input terminal 60 to a power source circuit 61 and driving source is supplied from the power source circuit 61 to the power source circuit 39 of the camera head unit over a power cable enclosed within an optical fiber cable connected to the serial input/output port 40.

With the above described video camera of the present invention, the output signals from an imaging device are converted into digital signals which then are processed in a predetermined manner to produce digital composite video signals in a predetermined format, which in turn are converted into serial data for output, so that a video camera is provided which may be connected electrically over a small number of transmission lines to an external electronic system capable of digital signal processing.

Also, with the video camera of the present invention, the output signals of the imaging device are converted into digital signals, which are then converted into serial data, which are transmitted by transmission means to the camera control unit. The transmitted serial data are converted into parallel data and processed in a predetermined manner to produce digital video signals in a predetermined format, which are outputted. Thus a video camera is provided which enables digital video signals to be transmitted between the camera head unit and the camera control unit over a small number of transmission lines.

Furthermore, with the video camera of the present invention, the output signals of the imaging device are converted into digital signals, which are then converted into serial data, which are transmitted by transmission means to a camera control unit and then converted into parallel data. These parallel data are processed using image conversion and predetermined signal processing to produce digital video signals in a predetermined format, which are outputted. In this manner, a video camera is provided which enables image signals to be processed by image conversion within the camera control unit.

A modified embodiment of a video camera according to the present invention is hereinafter explained by referring to the drawings.

Figure 4:
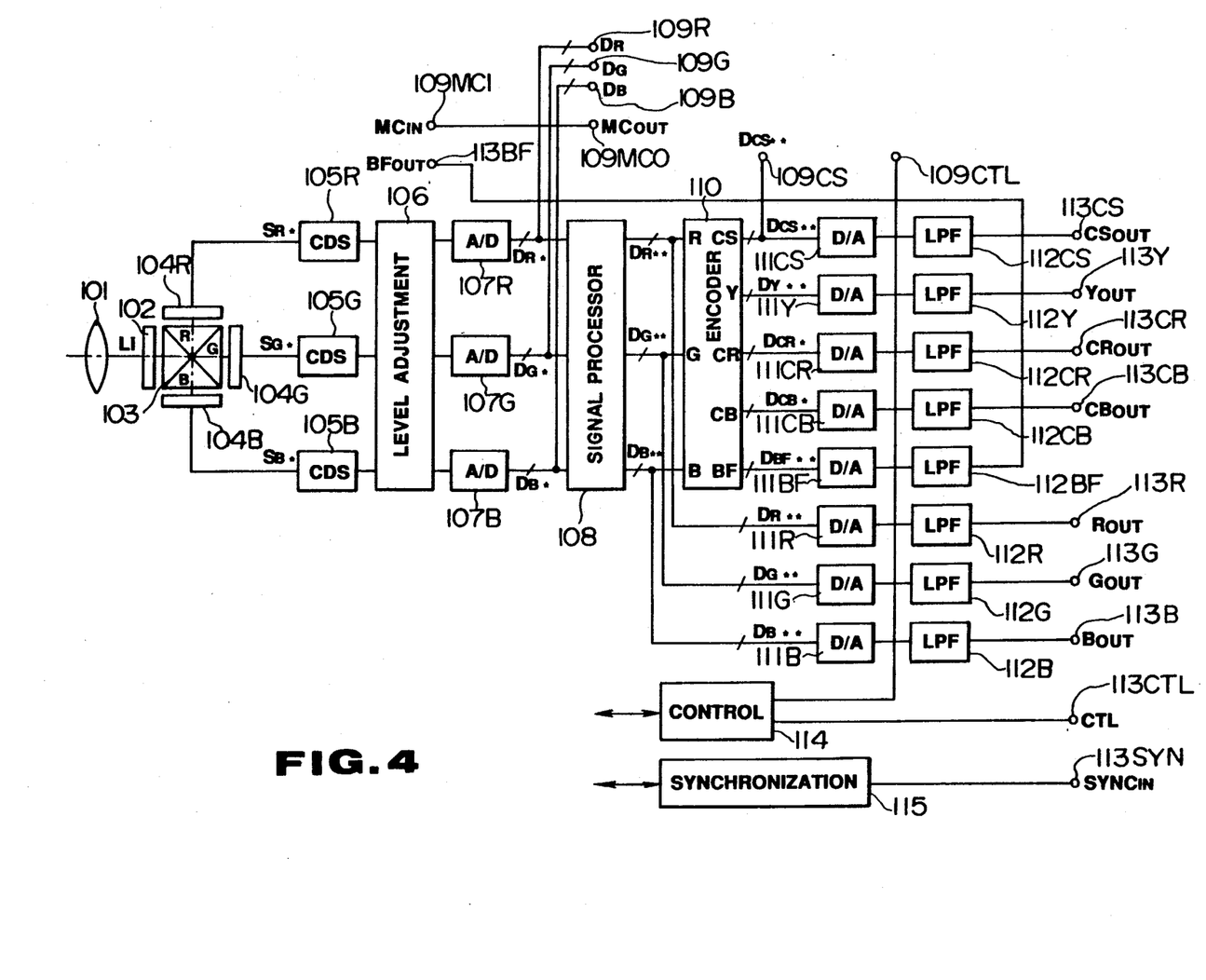
FIG. 4 is a block diagram showing another embodiment of a camera head unit of the video camera shown in FIG. 1.

FIG. 4 shows a modified camera head unit according to the present invention.

FIG. 4 shows a camera head unit of a video camera of the NTSC system in which the present invention is applied to a three CCD solid state imaging device in which an imaging light $L_i$ incident thereon from an imaging lens 101 by means of an optical low-pass filter 102 is separated by a color separation prism 103 into three-color light components, and three-color images of an object image are produced by three CCD image sensors 104R, 104G and 104B.

Figure 5:
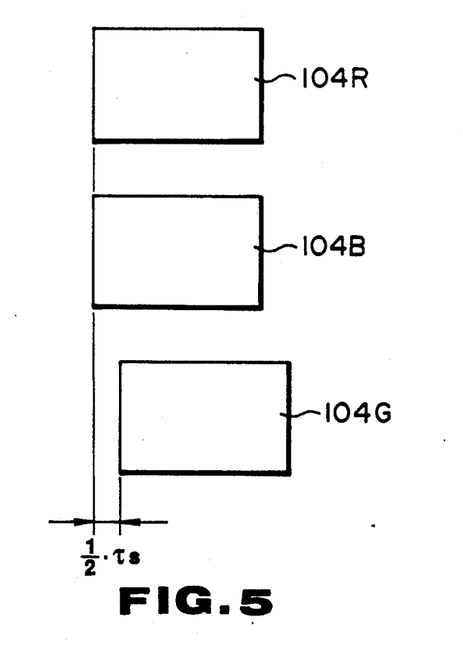
FIG. 5 is a schematic view showing the relative disposition between the solid-state imaging devices of the camera head unit shown in FIG. 4.

In the present camera head unit, the three-CCD image sensors 104R, 104G and 104B, constituting an image pickup, are arranged in accordance with a spatial pixel shifting scheme in which, as shown in FIG. 5, the CCD image sensors 104R and 104B for red color and blue color imaging are shifted with respect to the CCD image sensor 104G for green color imaging by a distance equal to one half of a spatial pixel sampling period $\tau_S$. The three CCD image sensors 104R, 104G and 104B are driven by a CCD driving circuit, not shown, and imaging charges of the respective pixels are read using a readout clock having a sampling frequency $f_S$ equal to four times the color sub-carrier frequency $f_{SC}$, or $4 f_{SC}$ (that is, $f_S = 4 f_{SC}$).

Figure 6A:
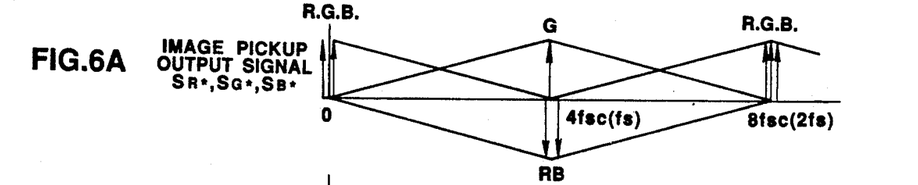

The three CCD image sensors 104R, 104G and 104B, operating in accordance with spatial pixel shifting, perform spatial sampling on the three-color images of the object image at positions shifted by $\tau_{S/2}$ from each other. Thus, as illustrated in the signal spectrum shown in FIG. 6A, at a sampling frequency $f_S$ the green-color imaging output signal $S_{G^*}$ from the CCD image sensor 104G is antiphase with respect to each of the red-color imaging output signal $S_{R^*}$ from the CCD image sensor 104R and the blue-color imaging output signal $S_{B^*}$ from the CCD image sensor 104B.

The respective color image pickup output signals $S_{R^*}$, $S_{G^*}$ and $S_{B^*}$ read out from the CCD image sensors 104R, 104G and 104B with readout clocks having the above-mentioned sampling frequency $f_S$ (equal to $4 f_{SC}$) are supplied to a level adjustment circuit 106 by means of correlation dual sampling circuits 105R, 105G and 105B, respectively.

The correlation dual sampling circuits 105R, 105G and 105B process the three-color imaging output signals $S_{R^*}$, $S_{G^*}$ and $S_{B^*}$, read out from the CCD image sensors 104R, 104G and 104B, by clamping the reset noise level and sample-holding the output level on the basis of the clamped noise level for reducing the reset noise.

The level adjustment circuit 106 also performs level adjustment, such as white balance adjustment, on the three-color imaging output signals $S_{R^*}$, $S_{G^*}$ and $S_{B^*}$, which have been processed by the correlation dual sampling circuits 105R, 105G and 105B for reducing the reset noise. The three-color imaging output signals $S_{R^*}$, $S_{G^*}$ and $S_{B^*}$, thus level-adjusted by the level adjustment circuit 106, are supplied to analog/digital (A/D) converters 107R, 107G and 107B, respectively.

Each of the A/D converters 107R, 107G and 107B is supplied with a clock by a timing generator, not shown, at a clock rate equal to the sampling rate $F_S$ of the three-color imaging output signals $S_{R^*}$, $S_{G^*}$ and $S_{B^*}$, that is, at a clock frequency $f_S (= 4 f_{SC})$ equal to the readout clock frequency of the CCD image sensors 104R, 104G and 104B. The A/D converters 107R, 107G and 107B directly digitize the three-color imaging output signals $S_{R^*}$, $S_{G^*}$ and $S_{B^*}$ at the clock rate $f_S (= 4 f_{SC})$ to produce digital three-color signals $D_{R^*}$, $DG_{G^*}$ and $D_{B^*}$ having the same output spectrum as the spectrum of the three-color imaging output signals $S_{R^*}$, $S_{G^*}$ and $S_{B^*}$ shown in FIG. 6A.

The digital three-color signals $D_{R^*}$, $D_{S^*}$ and $D_{B^*}$, produced by the A/D converters 107R, 107G and 107B, are supplied to a signal processing section 108, while being outputted at three-color signal output terminals 109R, 109G and 109B, respectively.

Figure 7:
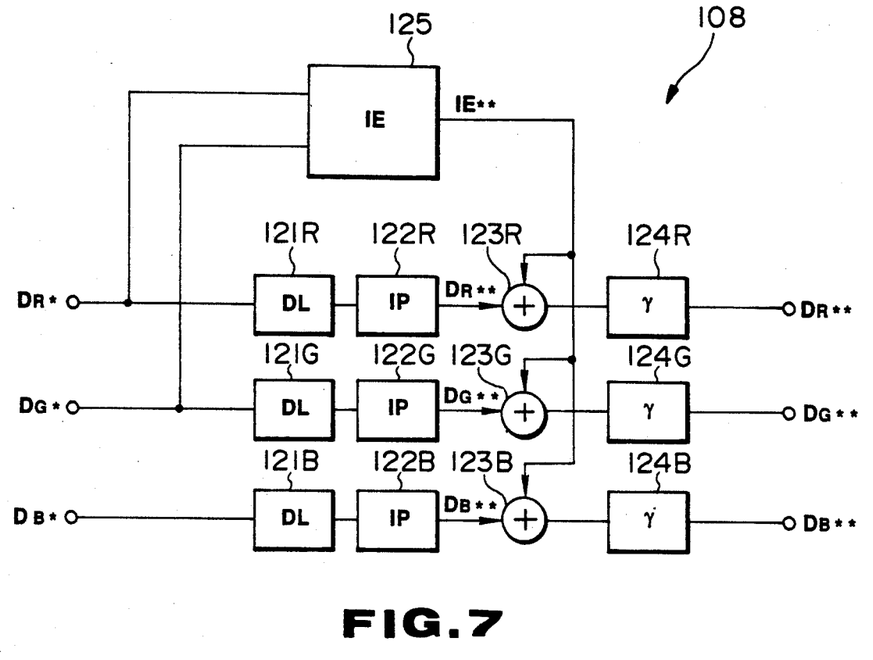
FIG. 7 is a block diagram showing a signal processing section of the camera head unit shown in FIG. 4.

FIG. 7 shows the construction of the signal processor 108, composed of interpolating sections 122R, 122G and 122B, supplied with the digital three-color signals $D_{R^*}$, $D_{G^*}$ and $D_{B^*}$ from the A/D converters 107R, 107G and 107B by means of delay circuits 121R, 121G and 121B, adders 123R, 123G and 123B, supplied with interpolated digital three-color signals $D_{R^{}}$, $D_{G^{}}$ and $D_{B^{**}}$ from these interpolating sections 122R, 122G and 122B, gamma correction circuits 124R, 124G and 124B, supplied with added output signals from the adders 123R, 123G and 123B and an image enhancement section 125 supplied with the digital three-color signals $D_{R^*}$ and $D_{G^*}$ produced by the A/D converters 107R and 107G, respectively.

The image enhancement section 125 produces a digital image enhancement signal $D_{IE^{**}}$ having a clock rate of $2f_S$ which is twice the clock rate $f_S$, that is, $8f_{sc}$, from the digital color signals $D_{R^*}$ and $D_{G^{}}$ produced by the A/D converters 107R and 107G at the clock rate $f_S$, that is, $4 f_{SC}$. The image enhancement section 125 supplies the digital image enhancement signal $D_{IE^{}}$ at the clock rate of $2F_S$ to the adders 123R, 123G and 123B, respectively.

The interpolating sections 122R, 122G and 122B process the digital three-color signals $D_{R^*}$, $D_{G^*}$ and $D_{B^*}$, supplied from the A/D converters 107R, 107G and 107B at the clock rate $f_S$, that is, $4 f_{sc}$, by interpolation, for producing the interpolated digital three-color signals $D_{R^{}}$, $D_{G^{}}$ and $D_{B^{}}$ having a clock rate $2F_S$ which is twice the clock rate $f_S$, that is, $8 f_{SC}$. The interpolating sections 122R, 122G and 122B supply the interpolated digital three-color signals $D_{R^{}}$, $D_{G^{}}$ and $D_{B^{}}$ at the clock rate of $2f_S$ to the adders 123R, 123G and 123B, respectively.

The adders 123R, 123G and 123B also perform image enhancement processing by adding the digital image enhancement signal $D_{IE^{}}$, supplied from the image enhancement processing section 125 at the clock rate of $2f_S$, to the interpolated digital three-color signals $D_{R^{}}$, $D_{G^{}}$ and $D_{B^{}}$, supplied from the interpolating sections 122R, 122G and 122B at the clock rate of $2f_S$, respectively. The adders 123R, 123G and 123B transmit the image-enhanced digital three-color signals $D_{R}$, $D_{G}$ and $D_{B**}$ to the gamma correcting circuits 124R, 124G and 124B, respectively.

The gamma correction circuits 124R, 124G and 124B process the image enhanced digital three-color signals $D_{R}$, $D_{G}$ and $D_{B}$ from the adders 123R, 123G and 123B by gamma correction to output gamma-corrected digital three-color signals $D_{R}$, $D_{G}$ and $D_{B}$, respectively.

In this manner, the signal processing section 108 outputs gamma-corrected image-enhanced digital three-color signals $D_{R}$, $D_{G}$ and $D_{B**}$ at the clock rate of $2f_S$, which are supplied to a color encoder 110, while also being supplied to digital/analog (D/A) converters 111R, 111G and 111B.

The D/A converters 111R, 111G and 111B process the three-color digital signals $D_{R}$, $D_{G}$ and $D_{B**}$ at the clock rate of $2f_S$, which are supplied to a color encoder 110, while also being supplied to digital/analog (D/A) converters 111R, 111G and 111B.

The D/A converters 111R, 111G and 111B process the three-color digital signals $D_{R}$, $D_{G}$ and $D_{B**}$, supplied from the signal processor 108 with high resolution at the clock rate of $2f_S$, into analog form, to produce three-color analog image output signals $R_{OUT}$, $G_{OUT}$ and $B_{OUT}$. The three-color analog image output signals, obtained by these D/A converters 111R, 111G and 111B, are outputted at three-color signal output terminals 113R, 113G and 113B, respectively, by means of low-pass filters 112R, 112G and 112B, respectively.

Figure 8:
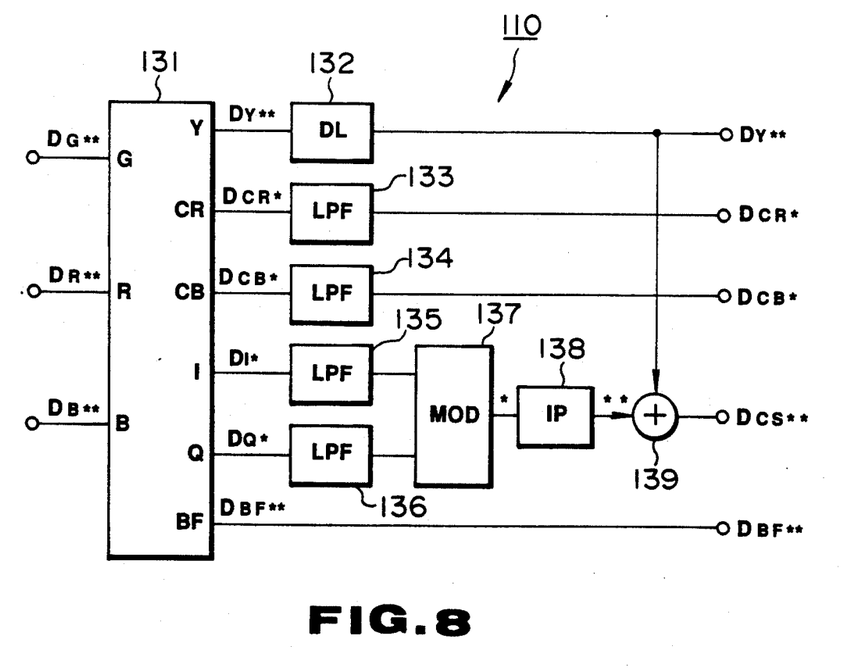
FIG. 8 is a block diagram showing a color encoder of the camera head unit shown in FIG. 4.

The color encoder 110, the detailed construction of which is shown in FIG. 8, is made up of a matrix circuit 131, supplied with the $2F_S$ clock rate digital three-color signals $D_{R}$, $D_{G}$ and $D_{B}$ from the signal processing section 108, a delay circuit 132 supplied with a high resolution digital luminance signal $D_{Y}$, formed by the matrix circuit 131, low-pass filters 133, 134, 135 and 136, supplied with digital color difference signals $D_{CR*}$, $D_{CB*}$, $D_{I*}$ and $D_{Q*}$, formed by the matrix circuit 131, a modulation circuit 137, supplied with the digital color difference signals $D_{I*}$ and $D_{Q*}$, formed by the matrix circuit 131, by means of the low-pass filters 135 and 136, and interpolating circuit 138, supplied with the modulated output signal from the modulating circuit 137, and an addition circuit 139, supplied with the interpolated output signals from the interpolating circuit 138 and with the digital luminance signal $D_{Y**}$, formed by the matrix circuit 131, by means of the delay circuit 132.

The matrix circuit 131 performs matrix processing on the $2F_S$ clock rate digital three-color signals $D_{R}$, $D_{G}$ and $D_{B}$ to produce the $2f_S$ clock rate high resolution digital luminance signal $D_{Y}$, a $2f_S$ clock rate digital video signal for view finder $D_{BF**}$ and the $F_S$ clock rate digital color difference signals $D_{CR*}$, $D_{CB*}$, $D_{I*}$ and $D_{Q*}$. The $2f_S$ clock rate digital luminance signal $D_{Y**}$, formed by the matrix circuit 131, corresponds to a luminance signal $Y^*$ having the frequency distribution shown in FIG. 6B.

The color encoder 110 outputs, as the digital component video signal for the digital three-color signals $D_{R}$, $D_{G}$ and $D_{B}$, the above mentioned digital Luminance signal $D_{Y}$ from the matrix circuit 131 by means of the delay circuit 132, while outputting the digital color difference signals $D_{CR*}$ and $D_{CB*}$ from the matrix circuit 131 by means of the low-pass filters 133 and 134. The delay circuit 132 provides the digital luminance signal $D_{Y**}$ with delay characteristics corresponding to the low-pass filters 133 and 134.

Figures 6B, 6C:
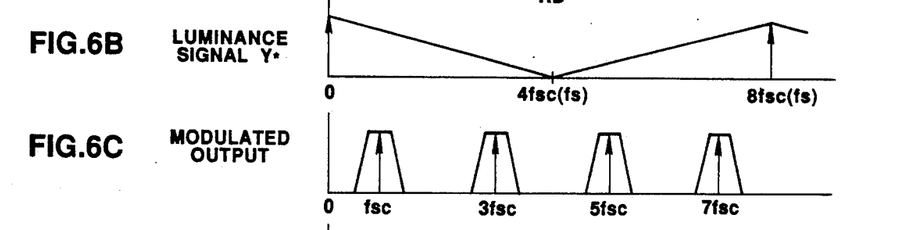

The modulating circuit 137 of the color encoder 110 performs a quadrature two phase modulation of the digital color difference signals $D_{I*}$ and $D_{Q*}$ supplied from the matrix circuit 131 by means of the low-pass filters 135 and 136. The modulated output signal from the modulating circuit 137 corresponds to a modulated color difference signal containing the odd harmonics of the color subcarrier frequency $f_{SC}$ and having a frequency distribution as shown in FIG. 6C.

Figure 6D:
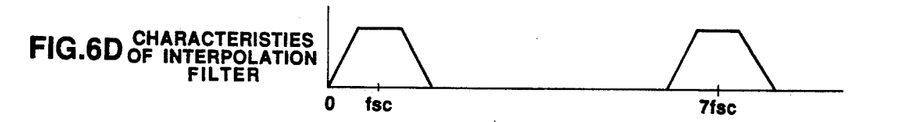
Figure 6E:
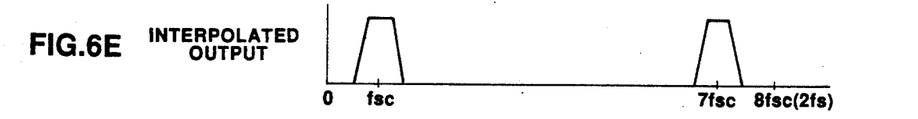

The interpolating circuit 138 processes the modulated output signal from the modulating circuit 137 using a digital filtering operation for extracting components at frequencies $f_{SC}$ and $7f_{SC}$ with a filtering characteristic shown in FIG. 6D to produce a digital modulated color difference signal having the clock rate $2f_S$ equal to $8f_{SC}$ and a frequency distribution as shown in FIG. 6E.

Figure 6F:
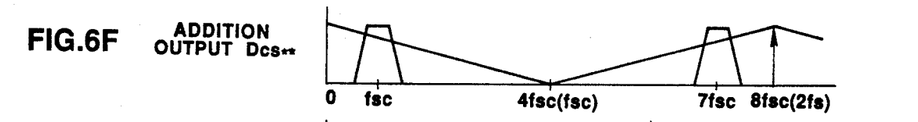

The addition circuit 139 of the color encoder 110 adds the digital luminance signal $D_{Y}$, outputted from the matrix circuit 131 by means of the delay circuit 132, and the $2f_S$ rate digital modulated color difference signal, produced by the interpolating circuit 138, to form a digital composite video signal $D_{CS}$ having a frequency distribution shown in FIG. 6F.

Thus the color encoder 110 produces and outputs, from the $2f_S$ clock rate digital three-color signals $D_{R}$, $D_{G}$ and $D_{B}$ gamma corrected and image enhanced by the signal processor 108, the digital component video signals, composed of the $2f_S$ clock rate high resolution digital luminance signal $D_{Y}$ and the $f_S$ clock rate digital color difference signals $D_{CR*}$ and $D_{CB*}$, while producing and outputting the $2f_S$ rate high resolution digital composite video signal $D_{CS}$ and the digital video signal for view finder $D_{BF}$.

The digital component video signals, that is the digital luminance signal $D_{Y**}$ and the digital color difference signals $D_{CR*}$ and $D_{CB*}$, outputted from the color encoder 110, are supplied to D/A converters 111Y, 111CR and 111CB.

The D/A converters 111Y, 111CR and 111CB process the digital luminance signal $D_{Y**}$ and the digital color difference signals $D_{CR}$ and $D_{CB}$ into analog component video signals $Y_{OUT}$, $CR_{OUT}$ and $CB_{OUT}$. These analog component video signals are outputted at analog video signal output terminals 113Y, 113CR and 113CB, respectively, by means of low-pass filters 112Y, 112CR and 112CB, respectively.

The digital composite video signal $D_{CS**}$, outputted from the color encoder 110, is supplied to a D/A converter 111CS, while being outputted at digital component video signal output terminal 109CS.

The D/A converter 111CS processes the $2f_S$ clock rate high resolution digital composite video signal $D_{CS**}$ into an analog composite video signal $CS_{OUT}$, which is outputted at an analog composite video signal output terminal 113CS by means of a low-pass filter 112CS.

The digital video signal for view finder $D_{BF}$, outputted from color encoder 110, is supplied to a digital/analog (D/A) converter 111BF. The D/A converter 111BF processes the digital video signal $D_{BF}$ into analog form to produce an analog video signal for view finder $BF_{OUT}$. The video signal $BF_{OUT}$ is supplied to an electronic view finder, not shown, at a signal output terminal 113BF by means of allow-pass filter 112BF.

With the above described color television camera apparatus, since the three-color imaging output signals $S_{R^*}$, $S_{G^*}$ and $S_{B^*}$, produced by the CCD image sensors 104R, 104G and 104B, are processed by the A/D converters 107R, 107G and 107B into digital three-color signals $D_{R^*}$, $D_{G^*}$ and $D_{B^*}$ which are outputted at the digital three-color signal output terminals 109R, 109G and 109B, an external system adapted for receiving the digital three-color signals $D_{R^*}$, $D_{G^*}$ and $D_{B^*}$ can be directly connected to the digital three-color signal output terminals 109R, 109G and 109B. Furthermore, since the digital three-color signals $D_{R^*}$, $D_{G^*}$ and $D_{B^*}$, formed by the A/D converters 107R, 107G and 107B are processed by the signal processor 108 into gamma corrected and image enhanced interpolated $2f_S$ clock rate digital three-color signals $D_{R^{}}$, $D_{G^{}}$ and $D_{B^{}}$, which signals $D_{R^{}}$, $D_{G^{}}$ and $D_{B^{}}$ are processed by the D/A converters 111R, 111G and 111B into the corresponding analog three-color signals $R_{OUT}$, $G_{OUT}$ and $B_{OUT}$, which are outputted at the three-color signal output terminals 113R, 113G and 113B, an external system adapted for receiving the analog three-color signals, $R_{OUT}$, $G_{OUT}$ and $B_{OUT}$, may be directly connected at the three-color signal output terminals 113R, 113G and 113B. In addition, since the $2f_S$ clock rate digital three-color signals $D_{R^{}}$, $D_{G^{}}$ and $D_{B^{}}$, produced by the signal processor 108, are processed by the color encoder 110 to produce the digital component video signals, that is the digital luminance signal $D_{Y^{}}$ and the digital color difference signals $D_{CR^*}$ and $D_{CB^*}$, as well as the digital composite video signal $D_{CS^{}}$ which is outputted at the digital composite video signal output terminal 109CS, an external devise adapted for receiving the digital composite video signal $D_{CS^{}}$ can be directly connected at the digital composite video signal output terminal 109CS. Also, since the digital component image signals, that is the digital luminance signal $D_{Y^{**}}$ and the digital color difference signals $D_{CR^*}$ and $D_{CB^*}$, produced by the color encoder 110, are processed by the D/A converters 111Y, 111CR and 111CB into analog component video signals $Y_{OUT}$, $CR_{OUT}$ and $CB_{OUT}$, which signals $Y_{OUT}$, $CR_{OUT}$ and $CB_{OUT}$ are outputted at the component signal output terminals 113Y, 113CR and 113CB, an external system adapted for receiving the analog component video signals $Y_{OUT}$, $CR_{OUT}$ and $CB_{OUT}$ may be directly connected at the component signal output terminal 113Y, 113CR and 113CB. Furthermore, since the digital composite video signal $D_{CS^{**}}$, formed by the color encoder 110, is processed by the D/A converter 111CS into the corresponding analog video signal $CS_{OUT}$, which is outputted at the analog composite signal output terminal 113CS, an external system adapted for receiving the analog composite video signals $CS_{OUT}$ may be directly connected to the analog composite signal output terminal 113CS.

Meanwhile, the camera head unit includes a control circuit block 114 connected to control signal terminals 109CTL and 113CTL, a synchronizing circuit block 115 connected to a synchronizing signal input terminal 113SYNC, a microphone input terminal 109MCI, connected to a signal line for voice signals obtained at a microphone, not shown, and a microphone output terminal 109MCO, connected to the microphone input terminal 109MCI.

Figure 9:
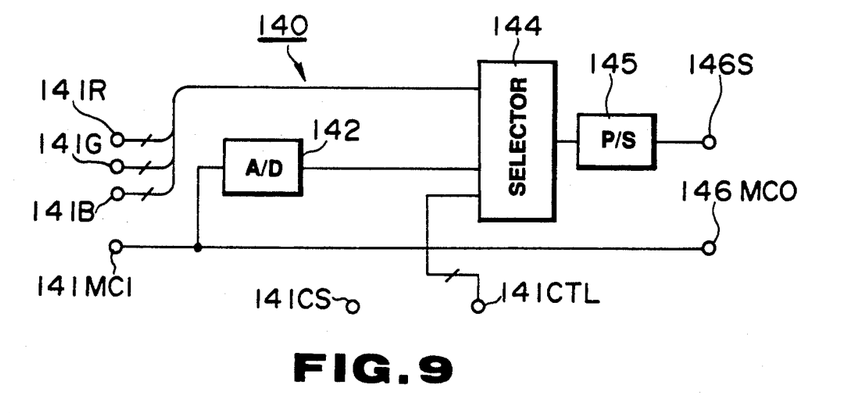
FIG. 9 to 11 are block diagrams showing different adapters mounted on the camera head unit shown in FIG. 4.
Figure 10:
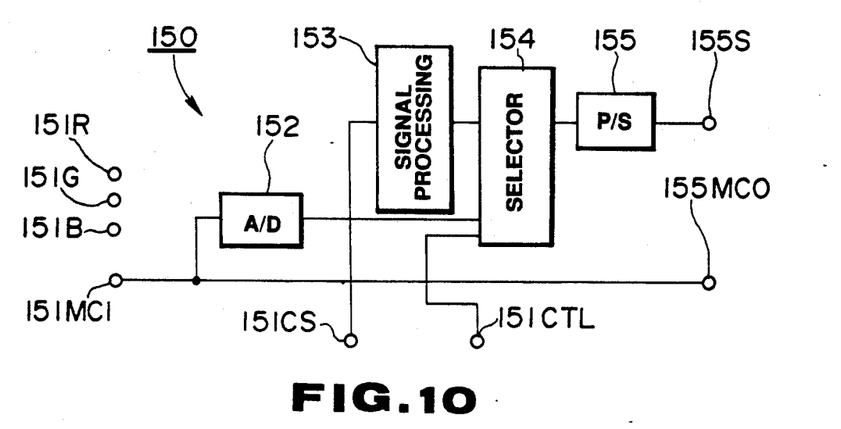
Figure 11:
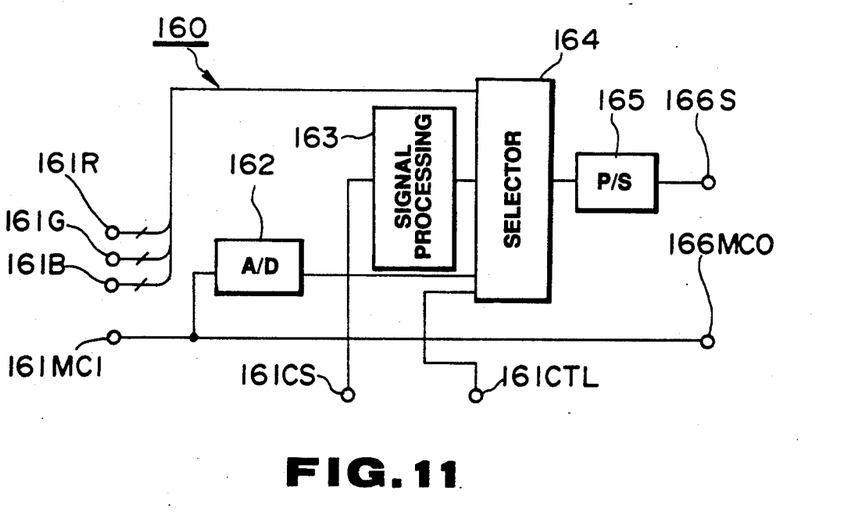

Various adapters, shown in FIGS. 9, 10 and 11, are provided in connection with the above described camera head unit.

FIG. 9 shows an adapter unit 140 for transmitting the digital three-color signals to a camera control unit adapted for handling the digital three-color signals. The adapter unit 140 is provided with digital three-color signal input terminals 141R, 141G and 141B, associated with the digital three-color signal output terminal 109R, 109G and 109B on the camera head unit, a digital composite video signal input terminal 141CS, associated with the digital composite video signal output terminal 109CS on the camera head unit, a microphone input terminal 141MCI, associated with the microphone output terminal 109MCO on the camera head unit, and with a control signal terminal 141CTL, associated with the control signal terminal 109CTL on the camera head unit. The adapter unit 140 is also provided with an A/D converter 142 connected to the microphone input terminal 141MCI, a data selector 144 having data input terminals connected to the output of the A/D converter 142, the digital three-color signal output terminals 109R, 109G and 109B and the control signal terminal 141CTL, a parallel/serial (P/S) converter 145, connected to the output terminal of the data selector 144, a serial signal output terminal 146S, connected to the output terminal of the P/S converter 145 and a microphone output terminal 146MCO, connected to the microphone input terminal 141MCI.

In the adapter unit 140, the microphone input terminal 141MCI is connected to the microphone output terminal 109MCO of the camera head unit. It is at the microphone input terminal 141MCI that analog voice signals are supplied from the camera head unit by means of the microphone output terminal 109MCO. The analog voice signals, supplied to the microphone input terminal 141MCI, are outputted in analog form by means of the microphone output terminal 146MCO, while being digitized by the A/D converter 142 and supplied by means of the data selector 144 to the P/S converter 145 so as to be converted by the P/S converter 145 from parallel data into serial data and outputted as serial data at the signal output terminal 146S.

The digital three-color signal input terminals 141R, 141G and 141B are connected to the digital three-color signal output terminals 109R, 109G and 109B on the main body of the color television camera apparatus. It is at these digital three color signal input terminals 141R, 141G and 141B that the digital three-color signals $D_{R^*}$, $D_{G^*}$ and $D_{B^*}$ are supplied from the main body of the color television camera apparatus by means of the digital three-color signal output terminal 109R, 109G and 109B, respectively. The digital three-color signals $D_{R^*}$, $D_{G^*}$ and $D_{B^*}$, supplied to these digital three-color signal input terminals 141R, 141G and 141B, are transmitted by means of the data selector 144 to the P/S converter 145 so as to be converted by the P/S converter from parallel data into serial data which are outputted at the signal output terminal 146S.

The control signal terminal 141CTL is connected to the control signal terminal 109CTL of the main body of the camera television camera apparatus. It is at the control signal terminal 141CTL that control signals are supplied from the camera head unit by means of the control signal terminal 109CTL. The control signals, supplied to the control signal terminal 141CTL, are supplied to the P/S converter 145 by means of the data selector 144 so as to be converted by the P/S converter from parallel data into serial data which are outputted at the signal output terminal 146S.

The digital composite video signal input terminal 141CS is adapted to be connected to the digital composite video signal output terminal 109CS of the camera head unit, and is not further connected to any components of the adapter unit 140.

FIG. 10 shows an adapter unit 150 for supplying a digital composite video signal to a digital video tape recorder for recording the digital composite video signal. The adapter unit 150 is provided with digital three-color signal input terminals 151R, 151G and 151B, a digital composite video signal input terminal 151CS, a microphone input terminal 1MCI and a control signal terminal 151CTL, associated with the digital three-color signal output terminals 109R, 109G and 109B, the digital composite video signal output terminal 109CS, the microphone output terminal 109MCO and the control signal terminal 109CTL of the camera head unit, respectively.

The adapter unit 150 includes an A/D converter 152 connected to the microphone input terminal 151MCI, a signal processor 153 connected to the digital composite video signal input terminal 151CS, a data selector 154 having data input terminals connected to the outputs of the signal processing section 153, the A/D converter 152 and the control signal terminal 151CTL, a P/S converter 155 connected to the output terminal of the data selector 154, a data output terminal 155S connected to the output of the P/S converter 155, and a microphone output terminal 155MCO, connected to the microphone input terminal 151MCI.

With the adapter unit 150, the microphone input terminal 151MCI is connected to the microphone output terminal 109MCO of the camera head unit. It is at the microphone input terminal 151MCI that analog voice signals are supplied from the camera head unit by means of the microphone output terminal 109MCO. The analog voice signals, supplied to the microphone input terminal 151MCI, are outputted in analog form by means of the microphone output terminal 155MCO, while being digitized by the A/D converter 152 and supplied to the P/S converter 155 by means of the data selector 154 so as to be converted by the P/S converter 155 from parallel data into serial data and outputted as serial data at the data output terminal 155S.

Figure 6G:
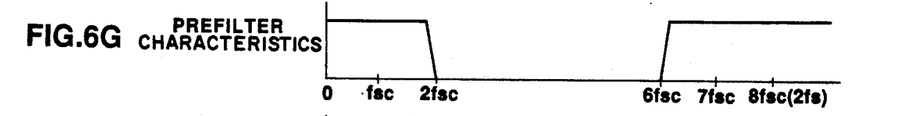
Figure 6H:
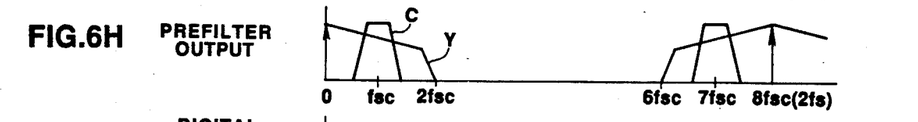
Figure 6I:
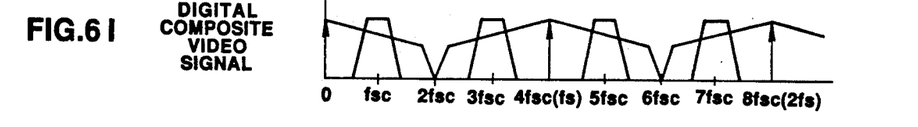

The digital composite video signal input terminal 151CS is connected to the digital composite video signal output terminal 109CS of the camera head unit. It is at the digital composite video signal input terminal 151CS that the digital composite video signal $D_{CS^{}}$ is supplied from the camera head unit by means of the digital composite video signal output terminal 109CS. The digital composite video signal $D_{CS^{}}$, supplied to the digital composite video signal input terminal 151CS, is bandwidth-limited to about $f_s/2$ or less, as shown in FIG. 6H, by a prefilter in the signal processing section 153 having filtering characteristics as shown in FIG. 6G. The bandwidth limited signals are then converted by down-sampling into digital composite video data $D_{CS^*}$ having the clock rate of $f_s$ as shown in FIG. 6I. The $f_s$ clock rate digital composite video data $D_{CS^*}$, produced by the signal processing section 153, are supplied to the P/S converter 155 by means of the data selector 154 so as to be converted by the P/S converter 155 from parallel data into serial data which are outputted at the data output terminal 155S.

The control signal terminal 151CTL is connected to the control signal terminal 109CTL of the camera head unit. It is at the control signal terminal 151CTL that control signals are supplied from the camera head unit by means of the control signal terminal 109CTL, The control signals supplied to the control signal terminal 151CTL are supplied by means of the data selector 154 to the P/S converter 155, which converts the signals from parallel data into serial data so as to be outputted as serial data at the data output terminal 155S.

The digital three-color signal input terminals 151R, 151G and 151 are connected to the digital three-color signal output terminals 109R, 109G and 109B of the camera head unit, and are not further connected to any component within the adapter unit 150.

FIG. 11 shows an adapter unit 160 for selectively outputting the digital three-color signals $D_{R^*}$, $D_{G^*}$, $D_{B^*}$ or the digital composite video signal $D_{CS^*}$ as serial data. The adapter unit 160 includes digital three-color signal input terminals 161R, 161G and 161B, a digital composite video signal input terminal 161CS, a microphone input terminal 161MCI and a control signal terminal 161CTL, associated with the digital three-color signal output terminals 109R, 109G and 109B, digital composite video signal output terminal 109CS, microphone output terminal 109MCO and the control signal terminal 109CTL of the camera head unit, respectively.

The adapter unit 160 includes an A/D converter 162, connected to the microphone input terminal 161MCI, a signal processing section 163 connected to the digital composite video signal input terminal 161CS, a data selector 164 having data input terminals connected to the outputs of the signal processing section 163 and the A/D converter 162, the digital three-color signal input terminals 161, 161 and 161B and the control signal terminal 161CTL, a P/S converter 165 connected to the output of the data selector 164, a data output terminal 166S connected to the output of the P/S converter 165, and a microphone output terminal 166MCO, connected to the microphone input terminal 161MCI.

The microphone input terminal 161MCI of the adapter unit 160 is adapted to be connected to the microphone output terminal 109MCO of the camera head unit. It is at the microphone input terminal 161MCI that analog voice signals are supplied from the camera head unit by means of the microphone output terminal 109MCO. The analog voice signals supplied to the microphone input terminal 161MCI are outputted as analog signals by mean of the microphone output terminal 166MCO, while being digitized by means of the A/D converter 162 and supplied by means of the data selector 164 to the P/S converter 165, whereby the digital signals are converted from parallel data into serial data so as to be outputted as serial data at the data output terminal 166S.

The digital three-color signal input terminals 161R, 161G and 161B are adapted to be connected to the digital three-color signal output terminals 109R, 109G and 109B of the camera head unit. It is at these digital three-color signal input terminals 161R, 161G and 161B that the digital three-color signals $D_{R^*}$, $D_{G^*}$ and $D_{B^*}$ are supplied by means of the output terminals 109R, 109G and 109B from the camera head unit. The digital three-color signals $D_{R^*}$, $D_{G^*}$ and $D_{B^*}$, supplied to these digital three-color signal input terminals 161R, 161G and 161B, are supplied by means of the data selector 164 to the P/S converter 165, whereby the digital signals are converted from parallel data into serial data, so as to be outputted as serial data at the data output terminal 166S.

The digital composite video signal input terminal 161CS is adapted to be connected to the digital composite video signal output terminal 109CS of the camera head unit. It is at the digital composite video signal input terminal 161CS that the digital composite video signal $D_{CS^{\bullet\bullet}}$ is supplied from the camera head unit by means of the digital composite video signal output terminal 109CS. The digital composite video signal $D_{CS^{\bullet\bullet}}$ supplied at the digital composite video signal input terminal 161CS, is converted by down-sampling by the signal processor 163 into a digital composite video signal $D_{CS^{\bullet}}$ with a clock rate equal to $f_s$, and then supplied by means of the data selector 164 to the P/S converter 165, which converts the digital signal from parallel data into serial data so as to be outputted as serial data at the data output terminal 166S.

The control signal terminal 161CTL is adapted to be connected to the control signal terminal 109CTL of the camera head unit. It is at the control signal terminal 161CTL that control data are supplied from the camera head unit by means of the control signal terminal 109CTL. The control data supplied to the control signal terminal 161 CTL are supplied by means of the data selector 164 to the P/S converter 164, so as to be converted from parallel data into serial data which are outputted at the data output terminal 166S.

Although the video camera according to the present invention is so arranged and constructed that the adapters 140, 150 and 160, adapted for converting the digital three-color signals and the digital composite video signals from parallel data into serial data, are provided in the camera head unit, parallel to serial converting means for the digital three-color signals and digital composite video signals may also be arranged within the main body of the video camera apparatus.

Although an illustrative embodiment of the present invention, and various modifications thereof, have been described herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A video camera comprising:
first, second and third imaging means for each outputting simultaneously at least two respective color signals corresponding to pixels in different lines,
analog to digital converting means for converting said color signals simultaneously output from each of said imaging means into respective simultaneously output digital color signals,
means for adding to each other said simultaneously output digital color signals so as to produce respective interlaced digital color signals,
signal processing means for forming a digital composite video signal from said interlaced digital color signals,
first output means for outputting said interlaced digital color signals, and
second output means for outputting said digital composite video signal.

2. A video camera according to claim 1, further comprising:
parallel to serial converting means for converting said digital color signals into serial color data, and
third output means for outputting said serial color data.

3. A video camera according to claim 1, further comprising:
parallel to serial converting means for converting said digital composite video signal into serial composite data and
third output means for outputting said serial composite data.

4. A video camera comprising:
first, second and third imaging means for outputting respective color signals,
analog to digital converting means for converting said color signals into respective digital color signals,
signal processing means for forming a digital composite video signal and digital component video signals from said digital color signals,
first output means for outputting said digital color signals,
second output means for outputting said digital composite video signal,
selecting means for selecting said digital component video signals or said digital composite video signal as a selected video signal,
parallel to serial converting means for converting said selected video signal into serial selected data and
third output means for outputting said serial selected data.

5. A video camera comprising:
first, second and third imaging devices for outputting respective color signals,
analog to digital converting means for converting said color signals into respective digital color signals,
signal processing means supplied with said digital color signals for forming a digital composite video signal and digital component video signals,
selecting means for selecting said digital component video signals or said digital composite video signal as a selected video signal,
parallel to serial converting means for converting said selected video signal into serial data, and
output means for outputting said serial data.

6. A video camera comprising:
imaging means for simultaneously outputting at least two output signals corresponding to pixels in different lines of a representation of an object in a field of view of the camera,
analog to digital converting means for converting said output signals simultaneously output from said imaging means into respective simultaneously output digital signals,
means for adding to each other said simultaneously output digital signals so as to produce interlaced digital signals,
signal processing means for forming a digital composite video signal from said interlaced digital signals,
parallel to serial converting means for converting said digital composite signal into serial data, and
output means for outputting said serial data.

7. A video camera comprising:
imaging means for simultaneously outputting at least two output signals corresponding to pixels in different lines of a representation of an object in a field of view of the camera,
analog to digital converting means for converting said output signals simultaneously output from said imaging means into respective simultaneously output digital imaging signals, means for adding to each other said simultaneously output digital imaging signals so as to produce interlaced digital imaging signals, signal processing means for forming first digital video signals of a first predetermined format from said interlaced digital imaging signals, parallel to serial converting means for converting said interlaced digital imaging signals into serial imaging data, first output means for outputting said first digital video signals, and second output means for outputting said serial imaging data.

8. A video camera comprising:

imaging means for simultaneously outputting at least two output signals corresponding to pixels in different lines of a field representation of an object in a field of view of the camera;

camera head means including analog to digital converting means for converting said output signals simultaneously output from said imaging means into respective simultaneously output parallel format digital signals, and parallel to serial converting means for converting said respective simultaneously output parallel format digital signals into serial data;

transmission means for transmitting said serial data converted by said parallel to serial converting means of said camera head means; and camera control means including serial to parallel converting means for converting said serial data transmitted by said transmission means into respective simultaneously output parallel data signals, means for adding to each other said simultaneously output parallel data signals so as to produce interlaced parallel data signals, signal processing means for processing said interlaced parallel data signals to form digital video signals of a predetermined format, and output means for outputting said digital video signals.

9. A video camera comprising:

imaging means for providing output signals corresponding to an object in a field of view of the camera;

camera head means including analog to digital converting means for converting said output signals of said imaging means into parallel format digital signals, and parallel to serial converting means for converting said parallel format digital signals into serial data;

transmission means for transmitting said serial data converted by said parallel to serial converting means of said camera head means; and camera control means including serial to parallel converting means for converting said serial data transmitted by said transmission means into parallel data signals, image converting means for converting said parallel data signals into image-converted signals, signal processing means for processing said parallel data signals and said image-converted signals to form digital video signals of a predetermined format, and output means for outputting said digital video signals.

10. A video camera according to claim 9, wherein said image converting means performs image conversion based on an optical strain produced during light passage through said imaging means.

11. A video camera for use with an external device which supplies analog external video signals, comprising:

imaging means for providing output signals corresponding to an object in a field of view of the camera;

camera head means including first analog to digital converting means for converting said output signals of said imaging means into parallel format digital signals, and first parallel to serial converting means for converting said parallel format digital signals into serial data;

camera control means including second analog to digital converting means for converting said analog external video signals into digital external signals, and second parallel to serial converting means for converting said digital external signals into serial external data;

said camera head means further including first serial to parallel converting means for converting said serial external data into parallel format external signals, digital to analog converting means for converting said parallel format external signals into analog external signals, and displaying means for displaying said analog external signals;

transmission means for transmitting said serial data converted by said first parallel to serial converting means and for transmitting said serial external data;

said camera control means further including second serial to parallel converting means for converting said serial data transmitted by said transmission means into parallel data signals, signal processing means for processing said parallel data signals to form digital video signals of a predetermined format; and output means for outputting said digital video signals.

12. A video camera according to claim 11, wherein said displaying means is a prompter.

13. A video camera comprising:

imaging means for providing output signals corresponding to an object in a field of view of the camera;

camera head means including analog to digital converting means for converting said output signals of said imaging means into parallel format digital signals, first parallel to serial converting means for converting said parallel format digital signals into serial data, first serial to parallel converting means for converting serial processed data into parallel format processed signals, digital to analog converting means for converting said parallel format processed signals into analog processed signals, and a view finder for displaying said analog processed signals;

transmission means for transmitting said serial data converted by said first parallel to serial converting means of said camera head means and for transmitting said serial processed data; and camera control means including second serial to parallel converting means for converting said serial data transmitted from said first parallel to serial converting means by said transmission means into parallel data signals, signal processing means for processing said parallel data signals to form digital video signals of a predetermined format, output means for outputting said digital video signals, and second parallel to serial converting means for converting said digital video signals of said predetermined format into said serial processing data to be converted by said first serial to parallel converting means 14. A video camera comprising:

imaging means for providing output signals corresponding to an object in a field of view of the camera;

camera head means including driving means for supplying driving pulses, solid-state imaging means for simultaneously outputting at least two independent imaging signals corresponding to respective pixels of a field in response to said driving pulses, analog to digital converting means for converting said imaging signals simultaneously output from said solid-state imaging means into respective simultaneously output digital signals, and parallel to serial converting means for converting said respective simultaneously output digital signals into serial data;

transmission means for transmitting said serial data converted by said parallel to serial converting means of said camera head means; and camera control means including serial to parallel converting means for converting said serial data transmitted by said transmission means into respective simultaneously output parallel data signals, means for adding to each other said simultaneously output parallel data signals so as to produce interlaced parallel data signals, signal processing means for processing said interlaced parallel data signals to form digital video signals of a predetermined format, and output means for outputting said digital video signals.

15. A video camera comprising:

imaging means for providing output signals corresponding to an object in a field of view of the camera;

camera head means including driving means for supplying driving pulses, solid-state imaging means for providing independent imaging signals corresponding to respective pixels of a field in response to said driving pulses, analog to digital converting means for converting said imaging signals into digital signals, and parallel to serial converting means for converting said digital signals into serial data;

transmission means for transmitting said serial data converted by said parallel to serial converting means of said camera head means; and camera control means including serial to parallel converting means for converting said serial data transmitted by said transmission means into parallel data signals, image converting means for converting said parallel data signals into image converted signals, signal processing means for processing said image converted signals to form digital video signals of a predetermined format, and output means for outputting said digital video signals.

16. A video camera according to claim 15, wherein said image converting means performs image conversion based on an optical strain produced during light passage through said imaging means.

17. A video camera comprising:

imaging means for providing output signals corresponding to an object in a field of view of the camera;

camera head means including driving means for supplying driving pulses, solid-state imaging means for providing independent imaging signals corresponding to respective pixels of a field in response to said driving pulses, analog to digital converting means for converting said imaging signals into digital signals, first parallel to serial converting means for converting said digital signals into serial data, first serial to parallel converting means for converting serial processed data into parallel processed signals, digital to analog converted means for converting said parallel processed signals into analog signals, and a view finder for displaying said analog signals;

transmission means for transmitting said serial data converted by said parallel to serial converting means of said camera head means and for transmitting said serial processed data; and camera control means including second serial to parallel converting means for converting said serial data transmitted by said transmission means from said parallel to serial converting means into parallel data signals, signal processing means for processing said parallel data signals to form digital video signals of a predetermined format, second parallel to serial converting means for converting said digital video signals of said predetermined format into said serial processed data, and output means for outputting said digital video signals.

* * * * *